(12) United States Patent
Rajkotia

(10) Patent No.: US 8,095,114 B2
(45) Date of Patent: Jan. 10, 2012

(54) SYSTEM AND METHOD FOR PROVISIONING BROADCAST AND MULTICAST SERVICES IN A WIRELESS NETWORK

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1409 days.

(21) Appl. No.: 11/138,039

(22) Filed: May 26, 2005

(65) Prior Publication Data

US 2006/0089136 A1     Apr. 27, 2006

Related U.S. Application Data

(60) Provisional application No. 60/621,345, filed on Oct. 22, 2004.

(51) Int. Cl.
*H04M 1/66* (2006.01)

(52) U.S. Cl. .................................. 455/411; 455/414.3
(58) Field of Classification Search ............... 455/414.2, 455/414.3, 435.1, 456.3
See application file for complete search history.

(56) References Cited

U.S. PATENT DOCUMENTS

| | | | |
|---|---|---|---|
| 7,185,362 B2 * | 2/2007 | Hawkes et al. ................... 726/4 |
| 2004/0152473 A1 * | 8/2004 | Kuwano et al. ............ 455/456.2 |
| 2004/0162071 A1 * | 8/2004 | Grilli et al. ................. 455/435.1 |
| 2004/0229629 A1 * | 11/2004 | Yi et al. ..................... 455/452.2 |
| 2005/0075107 A1 * | 4/2005 | Wang et al. ................ 455/435.1 |
| 2005/0097624 A1 * | 5/2005 | Salo et al. ..................... 725/136 |

* cited by examiner

*Primary Examiner* — Nick Corsaro

(57) ABSTRACT

A method of provisioning broadcast services and multicast services in a mobile station is provided. The method includes receiving a selection of a program to be transmitted by a base station at a subsequent predetermined time. A BCMC Request Order is generated based on the selection. The BCMC Request Order is sent to the base station to request transmission of the program at the subsequent predetermined time.

20 Claims, 4 Drawing Sheets

SYSTEM AND METHOD FOR PROVISIONING BROADCAST AND MULTICAST SERVICES IN A WIRELESS NETWORK

CROSS-REFERENCE TO RELATED APPLICATION AND CLAIM OF PRIORITY

The present invention is related to that disclosed in U.S. Provisional Patent No. 60/621,345, filed Oct. 22, 2004, entitled "System and Method for Provisioning Broadcast and Multicast Services in a Wireless Network". U.S. Provisional Patent No. 60/621,345 is assigned to the assignee of the present application. The subject matter disclosed in U.S. Provisional Patent No. 60/621,345 is hereby incorporated by reference into the present disclosure as if fully set forth herein. The present application hereby claims priority under 35 U.S.C. §119(e) to U.S. Provisional Patent No. 60/621,345.

TECHNICAL FIELD OF THE INVENTION

The present invention relates generally to wireless networks and, more specifically, to a mechanism for provisioning broadcast services and multicast services in a wireless mobile station.

BACKGROUND OF THE INVENTION

Businesses and consumers use a wide variety of fixed and mobile wireless terminals, including cell phones, pagers, Personal Communication Services (PCS) systems, and fixed wireless access devices (e.g., vending machines with cellular capability). Wireless service providers create new markets for wireless devices and expand existing markets by making wireless devices and services cheaper and more reliable. Wireless service providers accomplish this, in part, by implementing new services, including broadcast services and multicast services.

Broadcast services enable all wireless devices (or mobile stations) to receive and view a broadcast data stream at a particular time. The broadcast data stream may be received by all subscribers that subscribe to broadcast services. Multicast services enable a select group of mobile stations to receive and view a multicast stream. The drawback to conventional broadcast services and multicast services is that the user of the mobile station must be available to operate the mobile station at the time of the broadcast or multicast.

For example, if a user wishes to view a one hour broadcast program that begins broadcasting at 8:00 PM, the user must be available to activate the broadcast services on the mobile station at 8:00 PM. However, if the mobile station user is unable to access or operate the mobile station at 8:00 PM, the user will not be able to view the broadcast program.

Therefore, there is a need in the art for improved base stations and mobile stations that enable a mobile station user to view a broadcast data stream at a later point in time. In particular, there is a need for a base station that may pre-schedule transmission of a broadcast program to a mobile station and for a mobile station that is able to store the broadcast program for later viewing.

SUMMARY OF THE INVENTION

In accordance with the present invention, a method and system for provisioning broadcast services and multicast services in a wireless mobile station are provided that substantially eliminate or reduce disadvantages and problems associated with conventional methods and systems.

To address the above-discussed deficiencies of the prior art, it is a primary object of the present invention to provide a method for provisioning broadcast services and multicast services in a wireless mobile station. According to an advantageous embodiment of the present invention, the method comprises receiving a selection of a program to be transmitted by a base station at a subsequent predetermined time. A BCMC Request Order is generated based on the selection. The BCMC Request Order is sent to the base station to request transmission of the program at the subsequent predetermined time.

According to one embodiment of the present invention, the mobile station is automatically activated at the predetermined time.

According to another embodiment of the present invention, the program is received from the base station and stored in the mobile station for subsequent viewing by a user.

According to still another embodiment of the present invention, the mobile station is automatically deactivated after the base station completes transmission of the program.

According to yet another embodiment of the present invention, a playback request for the program is received from the user subsequent to the predetermined time and the program is played for the user based on the playback request.

According to a further embodiment of the present invention, the BCMC Request Order comprises an encryption key for use in encrypting the program before transmission from the base station and the method further includes decrypting the program.

According to a still further embodiment of the present invention, the BCMC Request Order is operable to identify explicitly the program and the predetermined time.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
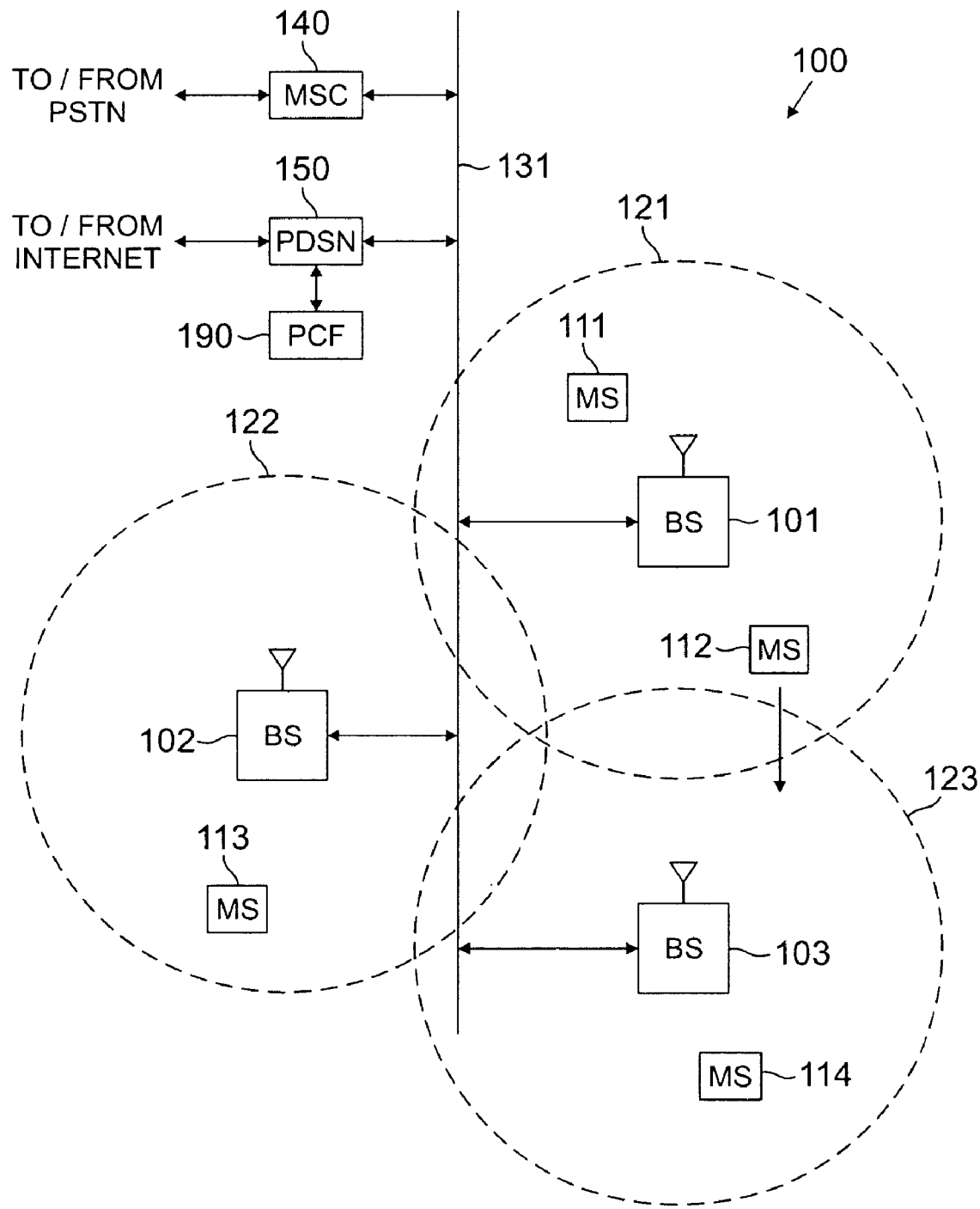
FIG. 1 illustrates an exemplary wireless network that provides broadcast (or multicast) services according to the principles of the present invention.

FIG. 1 illustrates exemplary wireless network 100, which provides broadcast (or multicast) services according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, wireless network 100 and the mobile stations accessing wireless network 100 implement broadcast and multicast services that enable all subscribing mobile stations, or a group of subscribing mobile stations, to view a broadcast/multicast data stream. The present invention enables MS 111-114 to store broadcast data streams for subsequent viewing. The present invention also enables each one of MS 111-114 to send to the base station a control message that pre-requests the transmission of a particular broadcast program at a later point in time.

Thus, the broadcast program may be downloaded without subsequent user intervention. Additionally, each one of MS 111-114 may be pre-programmed to turn on and receive the broadcast data stream at the correct point in time, even if the mobile station user takes no further action.

Figure 2:
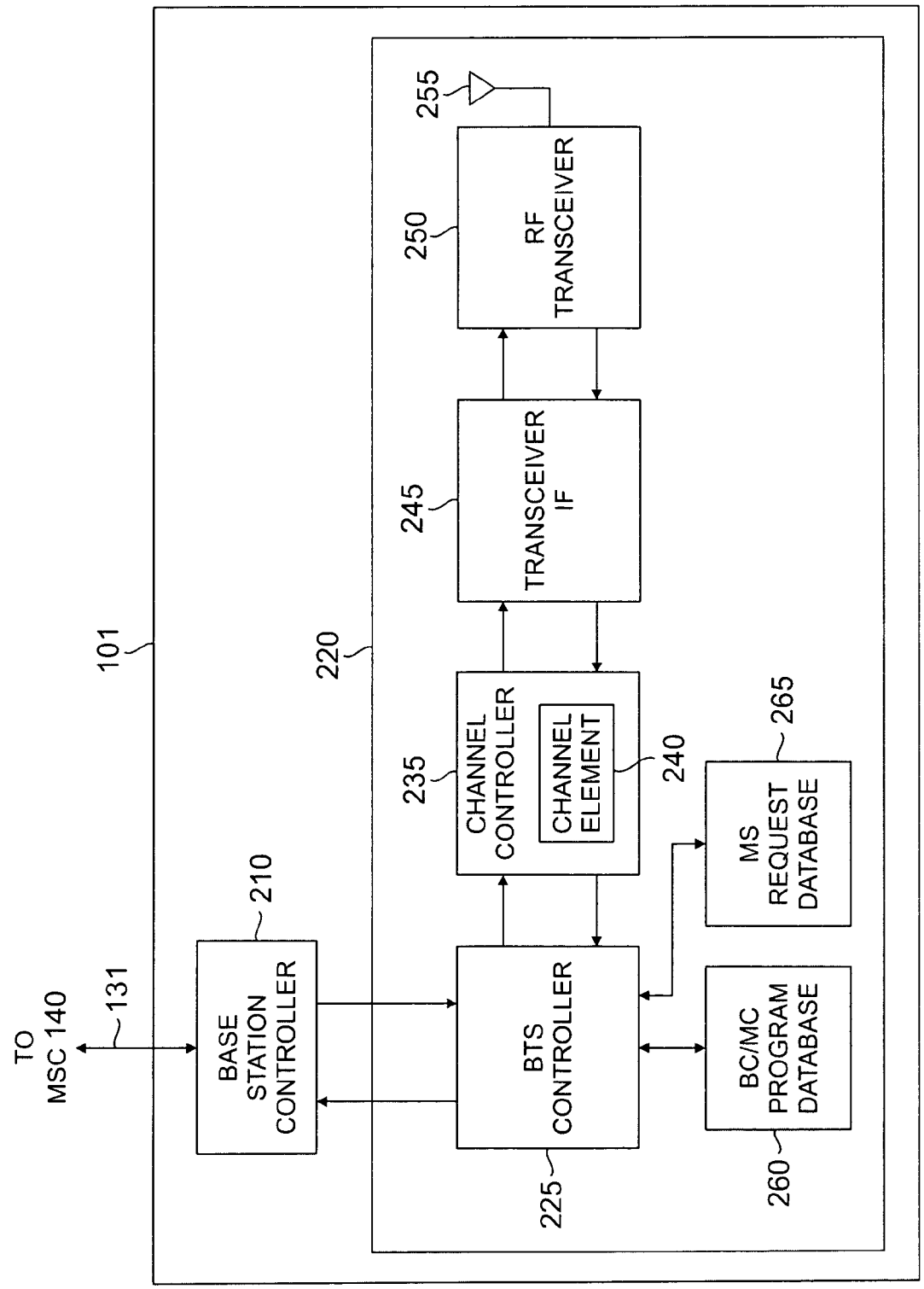
FIG. 2 illustrates in greater detail an exemplary base station that provides broadcast (or multicast) services according to the principles of the present invention.

FIG. 2 illustrates in greater detail exemplary base station (BS) 101, which provides broadcast (or multicast) services according to the principles of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver unit 250, and antenna array 255. BTS 120 further comprises broadcast/multicast (BC/MC) program database 260 and mobile station (MS) request database 265.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

According to the principles of the present invention, BTS controller 225 is capable of accessing broadcast programs stored in BC/MC program database 260 and mobile station requests for broadcast programs stored in MS request database 265. A mobile station user may arrange for the subsequent viewing of a broadcast/multicast data stream by sending a BCMC Request Order on a reverse channel. The BCMC Request Order may identify the broadcast program to be downloaded and the program time either explicitly or in any suitable manner. BTS controller 225 receives the BCMC Request Order and may store the BCMC Request Order in MS Request database 265, along with requests from other mobile stations. BTS controller 225 then schedules the broadcast program requested by the user. For alternative embodiments, BTS controller 225 may simply schedule the broadcast program without storing the BCMC Request Order or may store an altered form of the BCMC Request Order.

BS 101 knows where requesting mobile station (e.g., MS 111) is based on a location updating procedure. If MS 111 is still in the coverage area of BS 101 at the programmed time, BS 101 retrieves the broadcast program from BC/MC program database 260 and transmits the broadcast program to MS 111. However, if MS 111 leaves the coverage area of BS 101 before the programmed time, BS 101 may send the BCMC Request Order or the scheduling information to the new base station during the hand-off procedure. Alternatively, MS ill would have to re-request the program from the new base station.

Figure 3:
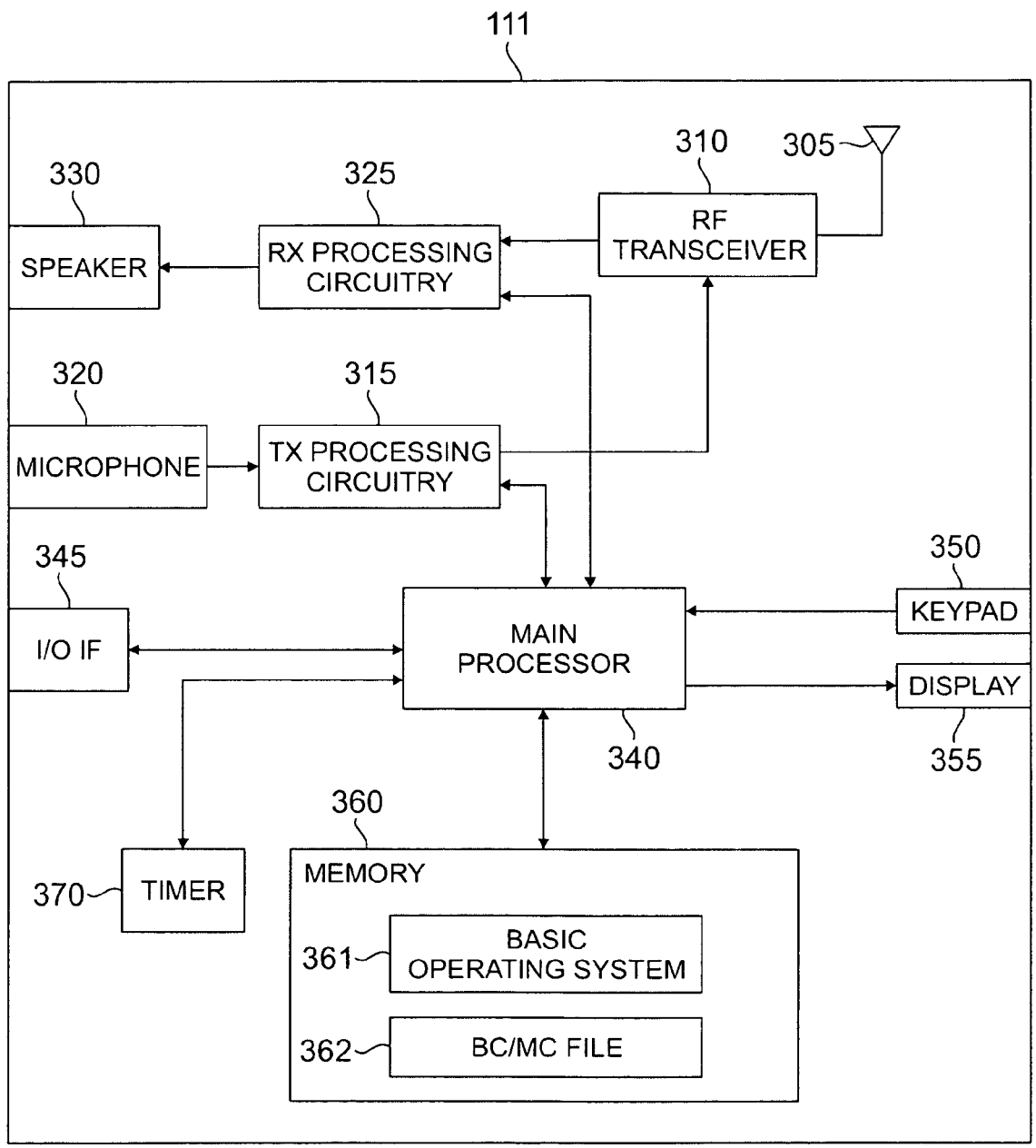
FIG. 3 illustrates in greater detail an exemplary wireless mobile station that provides broadcast (or multicast) services according to the principles of the present invention.

FIG. 3 illustrates in greater detail exemplary mobile station (MS) 111, which provides broadcast (or multicast) services according to the principles of the present invention. Wireless mobile station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, memory 360, and timer 370. Memory 360 stores basic operating system (OS) program 361 and broadcast/multicast (BC/MC) file 362. BC/MC file 362 stores the content of one or more broadcast data streams for subsequent playback by main processor 340.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of the present invention, main processor 340 is a microprocessor or microcontroller. Memory 360 is coupled to main processor 340. According to an advantageous embodiment of the present invention, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless mobile station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 111 with the ability to connect to other devices such as laptop computers and handheld computers. I/O interface 345 is the communication path between these accessories and main controller 340.

Main processor 340 is also coupled to keypad 350 and display unit 355. The operator of mobile station 111 uses keypad 350 to enter data into mobile station 111. Display 355 may be a liquid crystal display capable of rendering text and/or at least limited graphics from web sites. Alternate embodiments may use other types of displays.

Main processor 340 also controls the downloading of the broadcast program at the pre-programmed time. The control software executed by main processor 340 for pre-requesting a broadcast program and subsequently downloading the broadcast program may be part of basic operating system program 361. Timer 370 is used to activate main processor 340 prior to the start of the transmission of the broadcast program by BS 101. As soon as BS 101 begins transmitting the broadcast program, main processor 340 begins storing the information in BC/MC file 362. Since a BCMC transmission may be received while MS 111 is in the idle state, the user of MS 111 does not have to perform any intervention, except for keeping the mobile station turned on. When the broadcast program is completely transmitted, internal timer 370 within the mobile station will turn off the reception. The user may subsequently prompt MS 111 to playback the stored broadcast data stream.

For security purposes, when MS 111 sends the BCMC Request Order to request the program, MS 111 may include an encryption key for a private key encryption algorithm. BS 101 uses the key to encrypt the broadcast program. Only MS 111 has the required key for decrypting the encrypted broadcast program.

In one embodiment of the present invention, MS 111 may interface with one or more peripheral devices via I/O interface 345. The external interfaces may be used, for example, to store or to playback the downloaded broadcast program.

Figure 4:
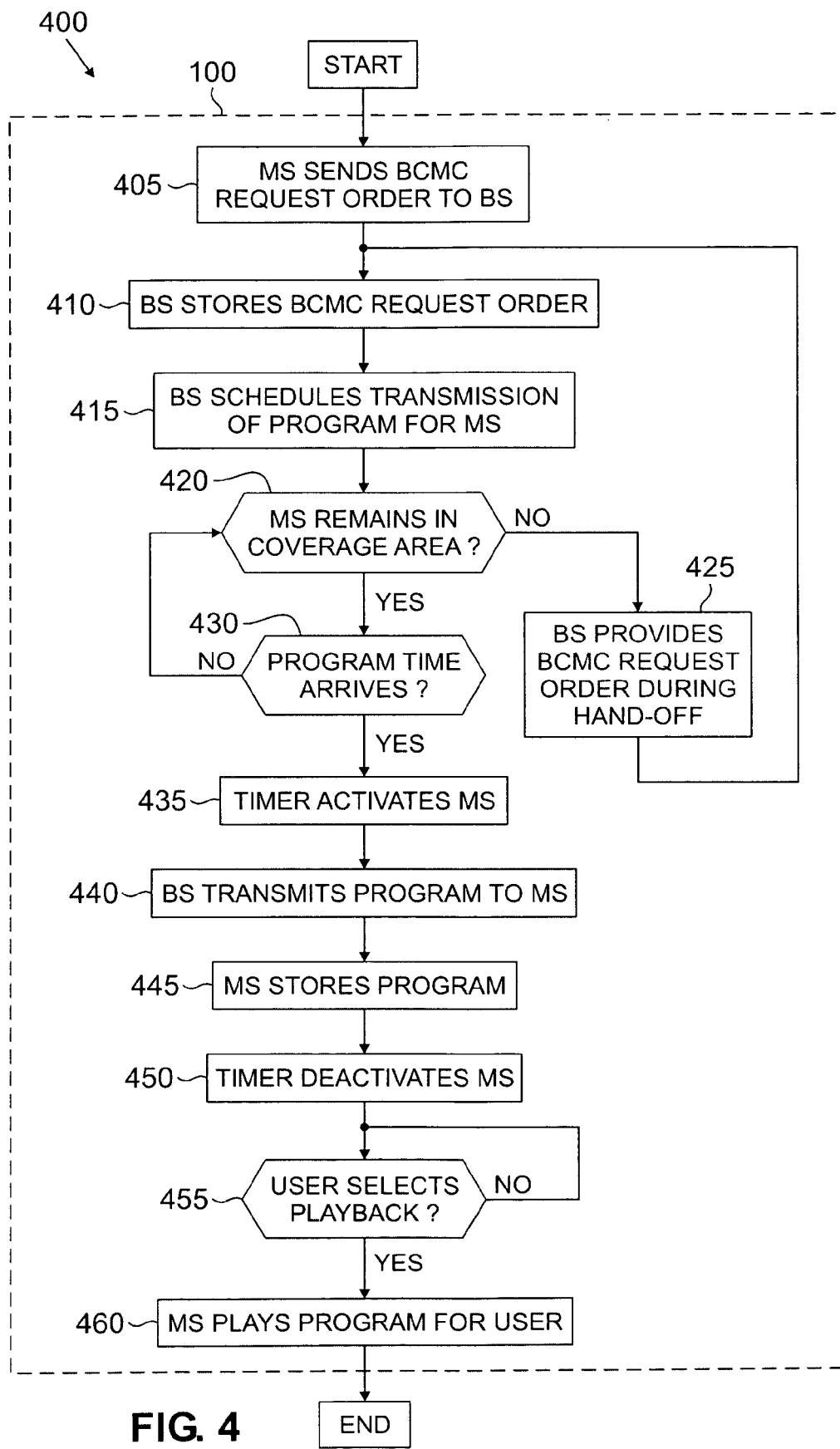
FIG. 4 is a flow diagram illustrating a method for provisioning broadcast (or multicast) services in the wireless network of FIG. 1 according to the principles of the present invention.

FIG. 4 is a flow diagram illustrating a method 400 for provisioning broadcast (or multicast) services in wireless network 100 according to the principles of the present invention. For the purposes of simplicity and clarity in explaining the operation of the present invention, it shall be assumed in the following example that base station (BS) 101 of wireless network 100 provides service for mobile station (MS) 111. However, the descriptions that follow also apply to the remaining base stations and mobile stations in wireless network 100.

Initially, MS 111 sends a BCMC Request Order to BS 101 to request the scheduling of a transmission of a program to be stored in MS 111 for subsequent viewing (process step 405). BS 101 may store the BCMC Request Order (optional process step 410) in MS Request Database 265. BS 101 then schedules transmission of the program for MS 111 (process step 415). For alternate embodiments, BS 101 may schedule the transmission without storing the BCMC Request Order or may store an altered form of the BCMC Request Order.

If MS 111 leaves the coverage area of BS 101 before the program time arrives (process steps 420 and 430), BS 101 may provide the BCMC Request Order to the new base station during a hand-off procedure (optional process step 425). Alternatively, MS 111 may have to re-request the transmission from the new base station.

However, if MS 111 remains in the coverage area of BS 101 when the program time arrives (process steps 420 and 430), timer 370 automatically activates MS 111 without any user intervention. It will be understood that timer 370 may activate MS 111 any suitable amount of time prior to the program transmission. For example, timer 370 may activate MS 111 ten seconds before the program time to ensure that MS 111 is ready to receive and store the program when transmission begins.

At the program time, BS 101 transmits the scheduled program to MS 111 (process step 435), which stores the program in BC/MC File 362 (process step 440). After BS 101 has finished transmitting the program, timer 370 automatically deactivates MS 111. Later, when the user selects a playback option for the program (process step 455), MS 111 plays the stored program for the user (process step 460).

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with a plurality of mobile stations in a coverage area of the wireless network, a method of provisioning broadcast services and multicast services in one of the mobile stations, the method comprising:
   receiving a selection of a program to be transmitted by a base station at a subsequent predetermined time;
   generating a BCMC Request Order based on the selection, the BCMC Request Order comprising an encryption key for use in encrypting the program before transmission from the base station; and
   sending the BCMC Request Order to the base station to request transmission of the program at the subsequent predetermined time.

2. The method as set forth in claim 1, further comprising automatically activating the mobile station prior to the predetermined time.

3. The method as set forth in claim 2, further comprising:
   receiving transmission of the program from the base station; and
   storing the program in the mobile station for subsequent viewing by a user.

4. The method as set forth in claim 3, further comprising automatically deactivating the mobile station after the base station completes transmission of the program.

5. The method as set forth in claim 3, further comprising:
   receiving a playback request for the program from the user subsequent to the predetermined time; and
   playing the program for the user based on the playback request.

6. The method as set forth in claim 1, the method further comprising decrypting the program.

7. The method as set forth in claim 1, the BCMC Request Order operable to identify explicitly the program and the predetermined time.

8. For use in a wireless network capable of communicating with a plurality of mobile stations in a coverage area of the wireless network, a mobile station operable to have broadcast services and multicast services provisioned by a base station, the mobile station comprising:
   a timer operable to automatically activate the mobile station a specified amount of time prior to a predetermine time;
   a main processor operable to generate a BCMC Request Order, the BCMC Request Order comprising an encryption key for use in encrypting the program before transmission from the base station; and
   BC/MC file operable to store a program transmitted by the base station at the predetermined time.

9. The mobile station as set forth in claim 8, the main processor further operable to receive a selection of the program to be transmitted by the base station, to generate the BCMC Request Order based on the selection, and to send the BCMC Request Order to the base station to request transmission of the program at the predetermined time.

10. The mobile station as set forth in claim 9, the main processor further operable to receive transmission of the program from the base station and to store the program in the BC/MC file for subsequent viewing by a user.

11. The mobile station as set forth in claim 10, the main processor further operable to receive a playback request for the program from the user subsequent to the predetermined time and to play the program for the user based on the playback request.

12. The mobile station as set forth in claim 9, the BCMC Request Order operable to identify explicitly the program and the predetermined time.

13. The mobile station as set forth in claim 8, the timer further operable to automatically deactivate the mobile station after the base station completes transmission of the program.

14. The mobile station as set forth in claim 8, the BC/MC file further operable to store a plurality of programs transmitted by the base station.

15. For use in a wireless network capable of communicating with a plurality of mobile stations in a coverage area of the wireless network, a method of provisioning broadcast services and multicast services in the mobile stations, the method comprising:

receiving a BCMC Request Order from at least one of the mobile stations, the BCMC Request Order comprising a request for transmission of a program to be transmitted by the base station at a subsequent predetermined time, the BCMC Request Order further comprising an encryption key for use in encrypting the program before transmission from the base station;

scheduling transmission of the program to the mobile station; and transmitting the program to the mobile station at the predetermined time.

16. The method as set forth in claim 15, further comprising storing the BCMC Request Order.

17. The method as set forth in claim 16, further comprising:

performing a hand-off procedure to a second base station when the mobile station leaves a coverage area for the base station prior to the predetermined time; and providing the BCMC Request Order to the second base station during the hand-off procedure.

18. The method as set forth in claim 16, storing the BCMC Request Order comprising storing the BCMC Request Order in a request database operable to store a plurality of BCMC Request Orders from a plurality of mobile stations.

19. The method as set forth in claim 15, the BCMC Request Order operable to identify explicitly the program and the predetermined time.

20. The method as set forth in claim 15, further comprising retrieving the program from a program database for transmission to the mobile station.

\* \* \* \* \*